United States Patent
Kang

(10) Patent No.: US 11,031,647 B2
(45) Date of Patent: Jun. 8, 2021

(54) MANUFACTURING APPARATUS FOR BATTERY MODULE AND METHOD FOR MANUFACTURING BATTERY MODULE

(71) Applicant: LG CHEM, LTD., Seoul (KR)

(72) Inventor: Choon-Kwon Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 259 days.

(21) Appl. No.: 16/249,147

(22) Filed: Jan. 16, 2019

(65) Prior Publication Data

US 2019/0319225 A1 Oct. 17, 2019

(30) Foreign Application Priority Data

Jan. 17, 2018 (KR) .................. 10-2018-0005921

(51) Int. Cl.
| | |
|---|---|
| *H01M 50/166* | (2021.01) |
| *H01M 10/04* | (2006.01) |
| *H01M 50/10* | (2021.01) |
| *H01M 50/15* | (2021.01) |
| *H01M 50/147* | (2021.01) |
| *H01M 50/155* | (2021.01) |

(52) U.S. Cl.
CPC ..... *H01M 50/166* (2021.01); *H01M 10/0404* (2013.01); *H01M 50/10* (2021.01); *H01M 50/147* (2021.01); *H01M 50/15* (2021.01); *H01M 50/155* (2021.01)

(58) Field of Classification Search
CPC ............. H01M 50/166; H01M 50/155; H01M 50/171; H01M 50/164; H01M 10/04–049; B65C 9/30; B65C 9/0006; B65C 2009/0087
See application file for complete search history.

(56) References Cited

U.S. PATENT DOCUMENTS

| | | | |
|---|---|---|---|
| 2011/0183177 A1 | 7/2011 | Sohn | |
| 2013/0183561 A1* | 7/2013 | Laitinen | B60L 50/66 429/99 |
| 2013/0196202 A1* | 8/2013 | Kaiser | H01M 10/0436 429/94 |
| 2017/0324071 A1* | 11/2017 | Hirose | H01G 11/82 |

(Continued)

FOREIGN PATENT DOCUMENTS

| | | |
|---|---|---|
| KR | 10-2009-0058122 A | 6/2009 |
| KR | 10-2011-0087561 A | 8/2011 |

(Continued)

*Primary Examiner* — Matthew J Merkling
(74) *Attorney, Agent, or Firm* — Morgan, Lewis & Bockius LLP

(57) ABSTRACT

Provided a battery module manufacturing apparatus configured to insert a battery assembly into a module housing. The battery module manufacturing apparatus, which inserts a battery assembly including a plurality of secondary batteries into a module housing, includes: a protective film supply unit configured to supply a protective film so as to cover an outer surface of the battery assembly or to retrieve the protective film from the outer surface of the battery assembly; and a protective film transfer unit configured to move in an insertion direction in which the battery assembly is inserted into the module housing and a direction opposite to the insertion direction in a state of holding a part of the supplied protective film.

12 Claims, 12 Drawing Sheets

(56) References Cited

U.S. PATENT DOCUMENTS

2018/0083306 A1* 3/2018 Melack ............... H01M 10/049
2020/0328386 A1* 10/2020 Kellner ............. H01M 10/0481
2020/0373608 A1* 11/2020 Kim .................. H01M 10/0486

FOREIGN PATENT DOCUMENTS

| KR | 10-1624494 B1 | 5/2016 |
| KR | 10-2017-0078931 A | 7/2017 |

* cited by examiner

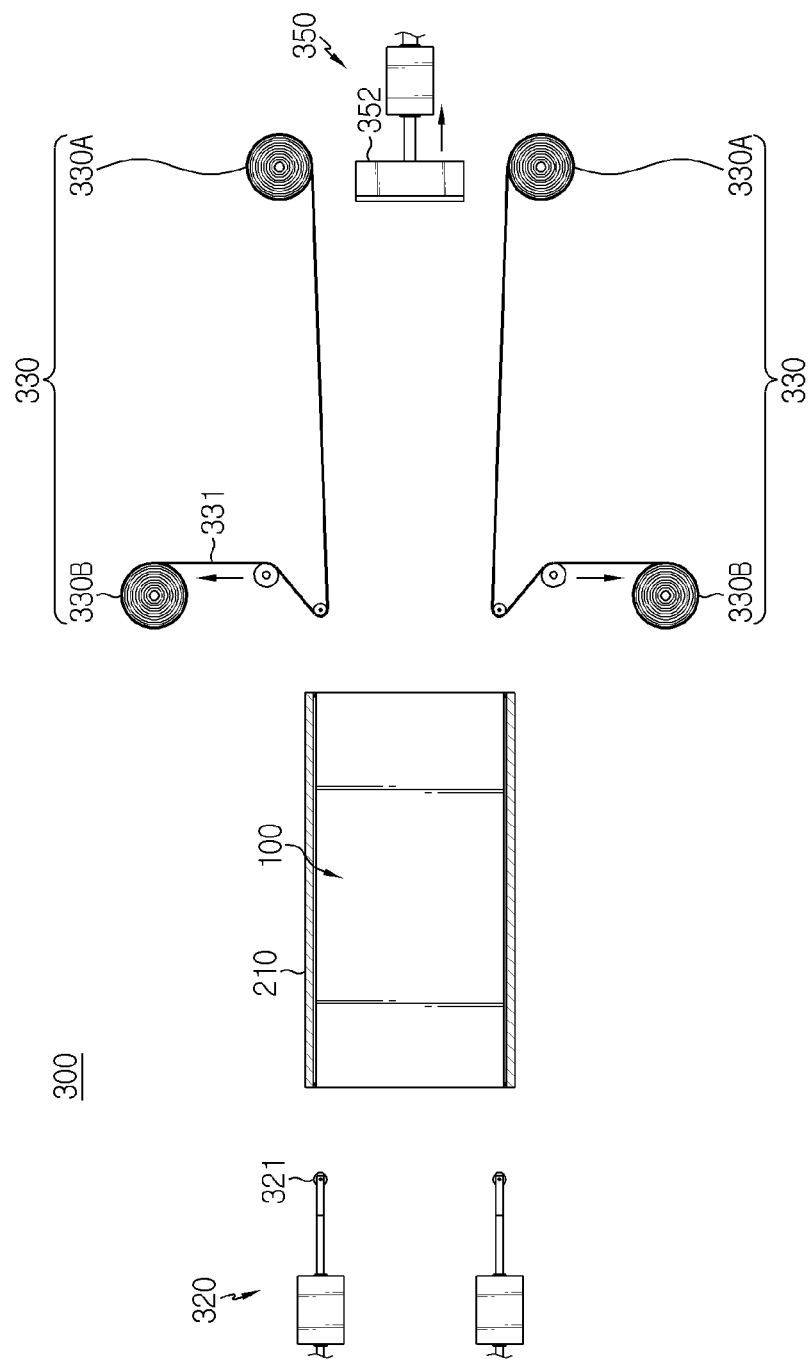

MANUFACTURING APPARATUS FOR BATTERY MODULE AND METHOD FOR MANUFACTURING BATTERY MODULE

TECHNICAL FIELD

The present application claims priority to Korean Patent Application No. 10-2018-0005921 filed on Jan. 17, 2018 in the Republic of Korea, the disclosures of which are incorporated herein by reference.

The present disclosure relates to a battery module manufacturing apparatus configured to insert a battery assembly into a module housing, and more particularly, to a battery module manufacturing apparatus which minimizes a failure rate of a battery module occurring during a manufacturing process.

BACKGROUND ART

Currently available secondary batteries include nickel-cadmium batteries, nickel-hydrogen batteries, nickel-zinc batteries, and lithium secondary batteries. Of these, lithium secondary batteries have almost no memory effect as compared with nickel-based secondary batteries, and are thus free for charge and discharge and have a very low self-discharge rate and a high energy density. Due to these advantages, lithium secondary batteries have attracted attention.

Such a lithium secondary battery mainly uses lithium-based oxide and carbonaceous materials as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator interposed therebetween, and an exterior member, that is, a battery pouch exterior member, which seals and accommodates the electrode assembly together with an electrolyte.

In recent years, such secondary batteries are widely used not only in small-sized devices such as portable electronic devices but also in medium- or large-sized devices such as automobiles or power storage devices. When the secondary batteries are used in the medium- or large-sized devices, a large number of secondary batteries are electrically connected so as to increase capacity and output. In particular, pouch type secondary batteries are widely used in the medium- or large-sized devices because they are easy to be laminated.

Meanwhile, in recent years, a need for large capacity structures, including utilization as an energy storage source, has been increasing, and there is an increasing demand for a battery module including a plurality of battery cells connected in series and/or in parallel.

Since the battery module is manufactured in such a manner that a plurality of battery cells are densely packed in a narrow space, it is important to easily discharge heat generated in each battery cell. Since the charge or discharge process of the secondary battery is performed by electrochemical reaction, the secondary battery is affected by the ambient temperature condition environment.

For example, when the charge and discharge process is performed in a state in which the battery is exposed to a high temperature condition in which an optimum temperature is not maintained, the charge and discharge efficiency of the secondary battery may be lowered, and it may be difficult to ensure the performance for normal driving.

Accordingly, the battery module of the related art separately includes a cooling member configured to appropriately maintain the temperature of the secondary battery by cooling heat generated in the process of generating electricity in the secondary battery, and a module housing made of a metal having high thermal conductivity.

For example, in the battery module of the related art, a plurality of secondary batteries are accommodated in a battery case, and a cooling member made of a material having high thermal conductivity is provided on the outer surface of the battery case to thereby form a battery assembly. Then, the battery assembly in which the cooling member is provided therein is inserted into a module housing, thereby manufacturing the battery module.

However, in the battery module of the related art, in the process of inserting the battery assembly into the module housing, the outer surface of the battery case and the cooling member formed on the outer surface of the battery case cause collision or friction with the side wall of the module housing. Thus, the battery case and the cooling member are liable to be seriously damaged. The manufacturing process is very troublesome and time-consuming, and it is easy to cause defects. In severe cases, the insertion process is impossible.

DISCLOSURE

Technical Problem

The present disclosure is designed to solve the problems of the related art, and therefore the present disclosure is directed to providing a battery module manufacturing apparatus configured to insert a battery assembly into a module housing.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module manufacturing apparatus, which inserts a battery assembly including a plurality of secondary batteries into a module housing, the battery module manufacturing apparatus including: a protective film supply unit configured to supply a protective film so as to cover an outer surface of the battery assembly or to retrieve the protective film from the outer surface of the battery assembly; and a protective film transfer unit configured to move in an insertion direction in which the battery assembly is inserted into the module housing and a direction opposite to the insertion direction in a state of holding a part of the supplied protective film.

In addition, the protective film supply unit may include two protective film supply rolls configured to supply the protective film so as to share the protective film and cover one side surface of the battery assembly, or to retrieve the protective film so as to be detached from one side surface of the battery assembly.

Furthermore, one of the two protective film supply rolls may be configured to supply the protective film so as to cover one side surface of the battery assembly, and the other thereof may be configured to retrieve the protective film so as to be detached from one side surface of the battery assembly.

The protective film transfer unit may include: a film holder configured to hang and hold the protective film; a transfer jig configured to mount the film holder; and a transfer cylinder configured to move the transfer jig in forward and backward directions.

Furthermore, the film holder may include a holding roller configured to be rotatable according to movement of the protective film.

In addition, the holding roller may be configured to be detachably attached to the transfer jig.

Furthermore, the protective film transfer unit may be configured to release a holding state to allow the protective film to be detached from the film holder.

The film holder may be configured to be moved through a space of the module housing formed so as to accommodate the battery assembly therein in a state of holding a part of the protective film supplied from the two protective film supply rolls.

Furthermore, the battery module manufacturing apparatus may further include a battery assembly transfer unit configured to move the battery assembly to allow the battery assembly to be inserted into the accommodation space of the module housing.

In addition, a heat dissipation pad may be provided on at least one of an upper surface, a lower surface, a left surface, and a right surface of the battery assembly.

Furthermore, the protective film transfer unit may be configured to transfer the protective film so as to cover an outer surface of the heat dissipation pad.

The protective film transfer unit may be configured to be movable in an insertion direction perpendicular to a direction in which the battery assembly is inserted into the module housing.

Furthermore, the protective film transfer unit may be positioned to allow the held protective film to press at least a part of the heat dissipation pad.

In addition, a structure in which a thickness of the battery assembly in an outward direction continuously increases in a direction opposite to the insertion direction in which the battery assembly is inserted into the module housing may be formed at one end portion of the heat dissipation pad.

Furthermore, the battery module manufacturing apparatus may further include a plurality of guide rollers configured to guide a moving direction of the protective film.

In addition, in another aspect of the present disclosure, there is also provided a battery module manufacturing method, in which a battery assembly including a plurality of secondary batteries is inserted into a module housing by using the battery module manufacturing apparatus of the present disclosure, the battery module manufacturing method including: (a) holding a protective film, which is unwound from a protective film supply unit, on a protective film transfer unit; (b) moving, by the protective film transfer unit, the protective film so as to pass through an internal space of the module housing for accommodating the battery assembly; (c) moving the battery assembly to allow the battery assembly to be inserted into the accommodation space of the module housing when the protective film covers the outer surface of the battery assembly; (d) detaching the protective film from the protective film transfer unit; and (e) winding and retrieving, by the protective film supply unit, the detached protective film.

Furthermore, the operation (c) may include transferring, by the protective film transfer unit, the protective film in an insertion direction in which the battery assembly is inserted into the module housing, and supplying, by the protective film supply unit, the protective film to the protective film transfer unit.

In another aspect of the present disclosure, a battery module may be manufactured by using the battery module manufacturing method.

Advantageous Effects

According to at least one of the embodiments of the present disclosure, since a protective film supply unit supplies a protective film so that the protective film covers an outer surface of a battery assembly, a battery module manufacturing apparatus can minimize occurrence of collision or friction between an outer portion of the battery assembly and the module housing, thereby minimizing the damage of the battery assembly and reducing the failure rate of the battery assembly.

In addition, according to at least one of the embodiments of the present disclosure, since a battery assembly to which a heat dissipation pad is attached can be smoothly inserted into a module housing, a process of inserting the battery assembly into the module housing may be facilitated, and the risk of damaging the heat dissipation pad may be greatly reduced.

Furthermore, according to at least one of the embodiments of the present disclosure, since a protective film supply unit retrieves a protective film when the insertion and fixing of a battery assembly is completed, the outer surface of the battery assembly and the inner surface of the internal space of the module housing can be allowed to come into contact with each other, thereby greatly increasing the completeness of the battery module without damaging the battery assembly.

In addition, according to at least one of the embodiments of the present disclosure, the supply and retrieval of a protective film can be performed more quickly by simultaneously using two protective film supply rolls, as compared with the use of one protective film supply roll. Therefore, there is an advantage that the manufacturing time of the battery module can be shortened.

Furthermore, according to at least one of the embodiments of the present disclosure, when two protective film supply rolls share the role of supplying or retrieving a protective film, one protective film supply roll supplies a new protective film so as to cover an outer surface of a battery assembly, and the other protective film supply roll retrieves the protective film already used in the inserting process. Since the protective film already used is not reused, there is an advantage that can reduce the failure rate due to the reuse of the damaged protective film.

According to at least one of the embodiments of the present disclosure, when a holding roller is provided as a film holder, since the holding roller is rotatable according to movement of a protective film, the protective film can be smoothly and precisely moved without being stagnated. Therefore, the frictional force between the outer surface of the battery assembly and the protective film can be minimized while the battery assembly is inserted, thereby preventing the wrinkle of the protective film.

Furthermore, according to at least one of the embodiments of the present disclosure, since a protective film transfer unit moves in a perpendicular direction in which a heat dissipation pad is pressed by a protective film, the total volume of the battery assembly to which the heat dissipation pad is attached can be reduced. Therefore, the process of inserting the battery assembly into the module housing can be facilitated, and the risk of damaging the heat dissipation pad can be greatly reduced.

In addition, according to at least one of the embodiments of the present disclosure, since a heat dissipation pad having a continuously thickening structure can effectively reduce friction or collision with a module housing, the heat dissipation pad exhibits effects that can minimize the failure rate due to damage and can shorten the time of the inserting process with the module housing.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIGS. 9 to 13 are schematic plan views of a process of manufacturing a battery module manufacturing apparatus, according to an embodiment of the present disclosure.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
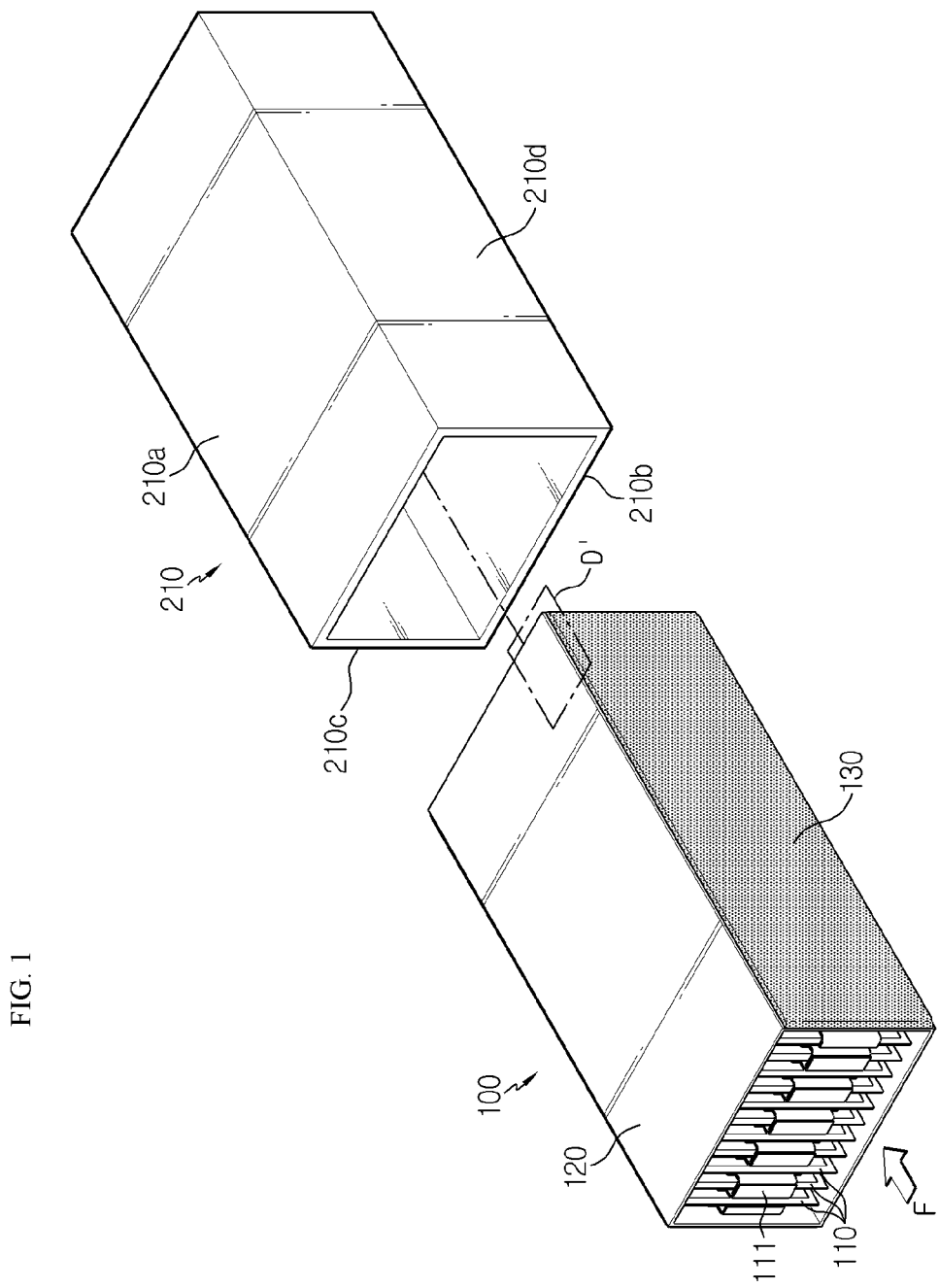
FIG. 1 is a perspective view schematically illustrating some components separated in a battery module, according to an embodiment of the present disclosure.
Figure 2:
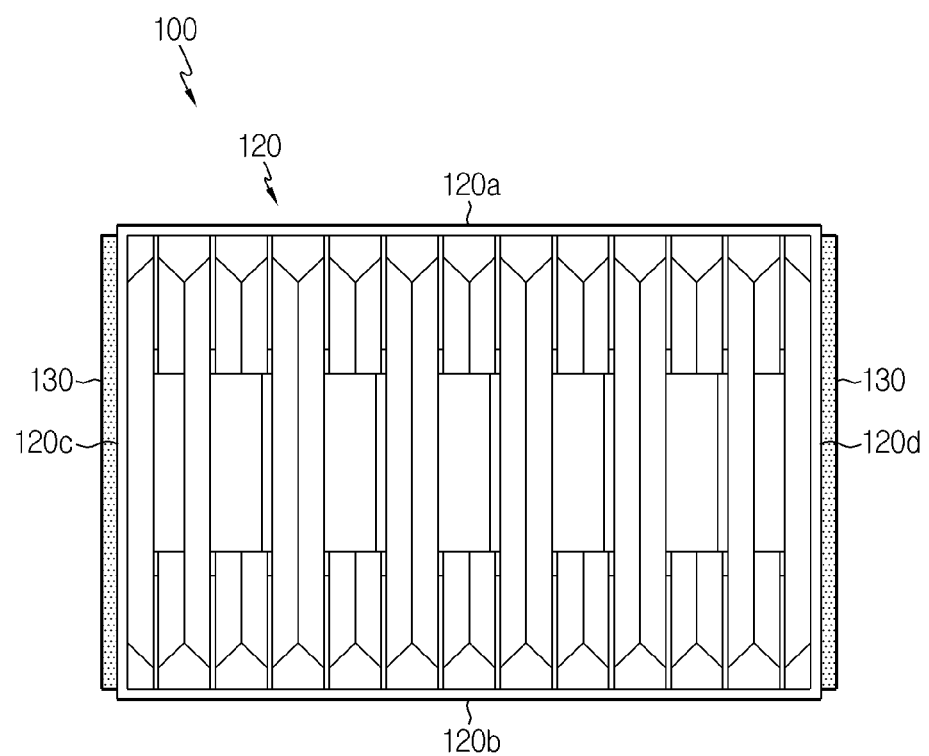
FIG. 2 is a front view schematically illustrating a battery assembly as a part of the battery module, according to an embodiment of the present disclosure.
Figure 3:
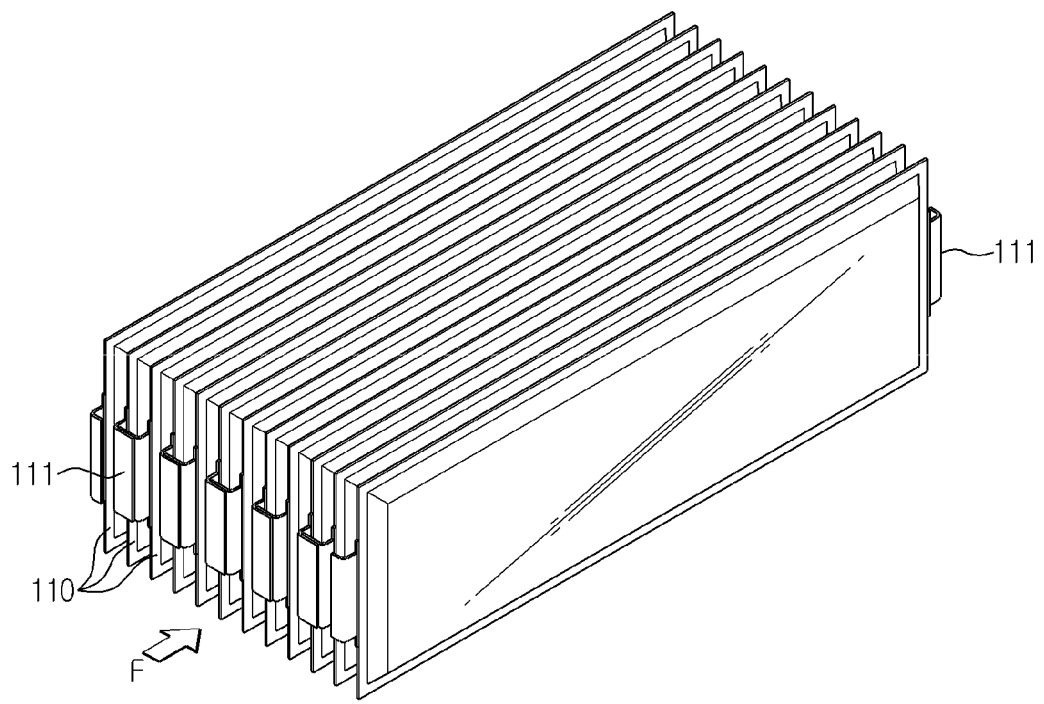
FIG. 3 is a perspective view schematically illustrating a plurality of secondary batteries as a part of the battery module, according to an embodiment of the present disclosure.
Figure 4:
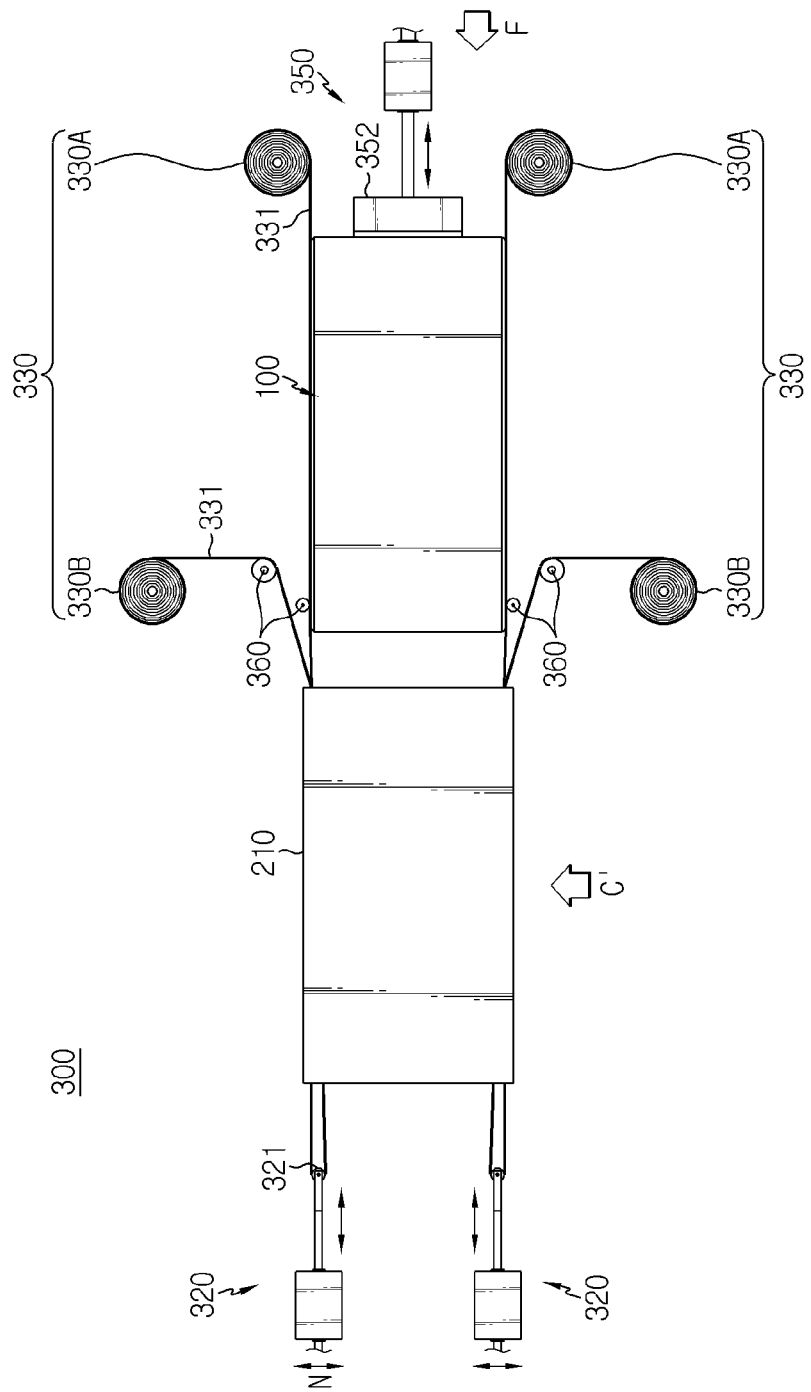
FIG. 4 is a plan view schematically illustrating a battery module manufacturing apparatus according to an embodiment of the present disclosure.

FIG. 1 is a perspective view schematically illustrating some components separated in a battery module, according to an embodiment of the present disclosure. FIG. 2 is a front view schematically illustrating a battery assembly as a part of the battery module, according to an embodiment of the present disclosure. FIG. 3 is a perspective view schematically illustrating a plurality of secondary batteries as a part of the battery module, according to an embodiment of the present disclosure. FIG. 4 is a plan view schematically illustrating a battery module manufacturing apparatus according to an embodiment of the present disclosure.

Referring to FIGS. 1 to 4, a battery module manufacturing apparatus 300 according to an embodiment of the present disclosure is a manufacturing apparatus that inserts a battery assembly 100 into a module housing 210.

Specifically, the battery assembly 100 may include a plurality of secondary batteries 110 laminated on each other, and a battery case 120.

In this case, the secondary battery 110 may be a pouch type secondary battery 110. In particular, the pouch type secondary battery 110 may include an electrode assembly, an electrolyte, and a pouch exterior member.

Here, the electrode assembly may be configured such that at least one positive electrode plate and at least one negative electrode plate are disposed with a separator interposed therebetween. More specifically, the electrode assembly may be classified into a winding type in which one positive electrode plate and one negative electrode plate are wound together with a separator, and a stacked type in which a plurality of positive electrode plates and a plurality of negative electrode plates are alternately stacked with a separator interposed therebetween.

In addition, the pouch exterior member may include an external insulating layer, a metal layer, and an internal adhesive layer. The pouch exterior member may include a metal thin film, for example, an aluminum thin film, so as to protect internal components such as the electrode assembly and the electrolyte, to compensate for electrochemical properties of the electrode assembly and electrolyte, and to improve heat dissipation. The aluminum thin film may be interposed between insulating layers made of an insulating material, so as to ensure electrical insulation between the components inside the secondary battery 110, such as the electrode assembly and the electrolyte, or other components outside the secondary battery 110.

In particular, the pouch exterior member may include two pouches, and at least one of the two pouches may have a concave internal space. The electrode assembly may be accommodated in the internal space of the pouch. Sealing portions are provided on the outer circumferential surfaces of the two pouches. Since the sealing portions are welded to each other, the internal space in which the electrode assembly is accommodated may be sealed.

Each of the pouch type secondary batteries 110 may include an electrode lead 111. The electrode lead 111 may include a positive electrode lead and a negative electrode lead. That is, the electrode lead 111 may be a positive electrode lead or a negative electrode lead having an electrical polarity.

More specifically, the electrode lead 111 may be configured to protrude forward or backward from the sealing portion disposed on the front or rear outer circumferential surface of the pouch exterior member. The electrode lead 111 may function as an electrode terminal of the secondary battery 110. For example, as illustrated in FIG. 3, one electrode lead 111 may protrude forward from the secondary battery 110, and the other electrode lead 111 may protrude rearward from the secondary battery 110.

Therefore, according to such a configuration of the present disclosure, there is no interference between the positive electrode lead and the negative electrode lead in one secondary battery 110. Therefore, the area of the electrode lead 111 may be widened and a welding process between the electrode lead 111 and the bus bar may be performed more easily.

In addition, a plurality of pouch type secondary batteries 110 may be included in the battery module 200 and may be laminated in at least one direction. For example, as illustrated in FIG. 3, a plurality of pouch type secondary batteries 110 may be laminated side by side in a lateral direction. In this case, the pouch type secondary batteries 110 may be arranged to be erected on the ground so that two wide surfaces are respectively disposed on the right and left sides, and the sealing portions are respectively disposed on the top, bottom, front, and rear sides, when viewed in an F direction. In other words, each of the secondary batteries 110 may be configured to be erected in a vertical direction.

Meanwhile, in the present specification, the terms indicating directions such as up, down, left, right, front, and rear may vary depending on the location of the observer or the arranged shape of the object. However, in the present specification, the directions such as up, down, left, right, front, and rear are separately illustrated based on the direction when viewed in the F direction.

Since the configuration of the pouch type secondary battery 110 described above is obvious to those skilled in the art to which the present disclosure belongs, detailed descriptions thereof will be omitted. Various secondary batteries 110 known at the time of filing of the present disclosure may be employed in the battery assembly 100 according to the present disclosure.

Meanwhile, the battery case 120 may have a box shape having an accommodation space capable of accommodating the plurality of secondary batteries 110 therein. In addition, the battery case 120 may serve as an exterior member that can protect the plurality of secondary batteries 110 from external impact. Furthermore, the battery case 120 may include an insulating material. For example, the battery case 120 may include a plastic material.

The front end and rear end of the battery case 120 may be opened so that the electrode leads 111 of the plurality of secondary batteries 110 are exposed to the outside. Furthermore, the battery case 120 may have a structure in which two parts are integrally coupled, or may be integrally manufactured.

In addition, the battery case 120 may have a sidewall. Specifically, the sidewall of the battery case 120 may include an upper sidewall 120a, a lower sidewall 120b, a left sidewall 120c, and a right sidewall 120d. Furthermore, the sidewalls 120a, 120b, 120c, and 120d may be configured to be in contact with or in close contact with the upper surfaces, the lower surfaces, the left surfaces, or the right surfaces of the plurality of secondary batteries 110.

In addition, a heat dissipation pad 130 may be provided on at least one of the upper portion, the lower portion, the left portion, and the right portion of the battery assembly 100. In this case, the heat dissipation pad 130 may be inserted into the sidewall of the battery case 120, or may be attached to the outer surface of the sidewall of the battery case 120.

For example, as illustrated in FIG. 2, the heat dissipation pad 130 may be provided on the outer surface of at least one of the upper sidewall 120a, the lower sidewall 120b, the left sidewall 120c, and the right sidewall 120d of the battery case 120 of the battery assembly 100.

Here, the heat dissipation pad 130 may include the electrically insulating material. The heat dissipation pad 130 may include a material having excellent thermal conductivity. Furthermore, the heat dissipation pad 130 may include a compressible material that easily expands and contracts in volume. For example, the heat dissipation pad 130 may include a rubber or a silicon-based material.

However, the heat dissipation pad is not necessarily limited to such materials, but any material having high thermal conductivity may be applied as long as the material can effectively absorb heat generated in the plurality of secondary batteries 110 and discharge the absorbed heat to the outside.

Therefore, according to such a configuration of the present disclosure, since the battery assembly 100 of the present disclosure includes the heat dissipation pad 130, heat generated by the charge and discharge of the secondary battery 110 can be effectively conducted from the heat dissipation pad 130 to the module housing 210, thereby enhancing the heat discharge rate and the cooling efficiency of the battery module 200.

Meanwhile, the module housing 210 may serve as an exterior member in the battery module 200. Therefore, the module housing 210 serves to provide structural stability to the battery module 200, and serves to protect the internally accommodated components such as the battery assembly 100 from other external physical factors such as impacts or materials. In addition, to this end, the module housing 210 may be made of a metal such as steel or aluminum.

In particular, when the module housing 210 is made of a metal material including aluminum, heat generated in the battery assembly 100 may be effectively discharged to the outside of the module housing 210 by using high thermal conductivity of aluminum.

In addition, the module housing 210 may include one or more sidewalls 210a, 210b, 210c, and 210d.

Specifically, when the module housing 210 has a plurality of sidewalls, the plurality of sidewalls may be connected to each other. For example, when viewed in the F direction, the sidewalls may include the upper sidewall 210a, the lower sidewall 210b, the left sidewall 210c, and the right sidewall 210d. The sidewalls 210a, 210b, 210c, and 210d may be coupled to each other.

The module housing 210 may have an internal space defined by the sidewalls 210a, 210b, 210c, and 210d so as to accommodate the battery assembly 100 therein. Specifically, the internal space of the module housing 210 may have an internal structure corresponding to the external shape of the battery assembly 100.

For example, as illustrated in FIG. 1, when the overall outer shape of the battery assembly 100 is formed in a rectangular parallelepiped shape, the module housing 210 may have a structure in which the upper sidewall 210a, the lower sidewall 210b, the left sidewall 210c, and the right sidewall 210b of the module housing 210 form right angles to each other so as to accommodate the battery assembly 100 therein.

Furthermore, the internal space may be provided so that one or more of the upper sidewall 210a, the lower sidewall 210b, the left sidewall 210c, and the right sidewall 210d of the module housing 210 are brought into contact with the outer surface of the battery assembly 100.

Therefore, according to such a configuration of the present disclosure, since the inner surface of the internal space of the module housing 210 and the outer surface of the battery assembly 100 are in contact with each other, the heat generated in the battery assembly 100 may be effectively conducted to the module housing 210, and the heat may be effectively discharged to the outside through the module housing 210.

Referring to FIG. 4 again, the battery module manufacturing apparatus 300 according to the embodiment of the present disclosure may include a protective film supply unit 330 and a protective film transfer unit 320.

Specifically, the protective film supply unit 330 may supply a protective film 331 so as to cover the outer surface of the battery assembly 100. Here, the protective film 331 may include a material having a smooth surface. For example, the protective film 331 may have a material having roughness and adhesion lower than those of the heat dissipation pad 130 or the outer surface of the battery case 120. For example, the protective film 331 may be a PET film, a polyvinyl chloride film, or a polycarbonate film.

In addition, the protective film supply unit 330 may supply the protective film 331 so that the protective film 331 can cover the outer surface of the battery assembly 100 while the battery assembly 100 is inserted into the internal space of the module housing 210.

Furthermore, when the upper surface, the lower surface, the left surface, and the right surface of the battery assembly 100 are provided, the protective film supply unit 330 may supply the protective film 331 so that the protective film 331 covers at least one of the upper surface, the lower surface, the left surface, and the right surface of the battery assembly 100.

For example, as illustrated in FIG. 4, the protective film supply unit 330 may supply two protective films 331 so as to cover the left and right surfaces of the battery assembly 100, respectively.

Therefore, according to such a configuration of the present disclosure, since the protective film supply unit 330 supplies the protective film 331 so that the protective film 331 covers the outer surface of the battery assembly 100, the protective film 331 can minimize the occurrence of collision or friction between the outer portion of the battery assembly 100 and the module housing 210, thereby minimizing the damage of the battery assembly 100 and reducing the failure rate of the battery assembly 100.

Furthermore, since the protective film 331 moves to the internal space of the module housing 210 while covering the battery assembly 100, the movement of the protective film 331 enables the battery assembly 100 to move to be inserted into the module housing 210.

Furthermore, when the heat dissipation pad 130 is provided in the battery assembly 100, the protective film supply unit 330 may supply the protective film 331 so as to cover the outer surface of the heat dissipation pad 130 of the battery assembly 100.

For example, as illustrated in FIG. 2, the battery assembly 100 may include heat dissipation pads 130 attached to the left surface 120*c* and the right surface 120*d*, respectively. In addition, as illustrated in FIG. 4, the protective film supply unit 330 may supply the protective film 331 so as to cover the outer surfaces of the heat dissipation pads 130 provided on both sides of the battery assembly 100.

Therefore, according to such a configuration of the present disclosure, since the battery assembly 100 to which the heat dissipation pad 130 is attached can be smoothly inserted into the module housing 210, the process of inserting the battery assembly 100 into the module housing 210 may be facilitated, and the risk of damaging the heat dissipation pad 130 may be greatly reduced.

The protective film supply unit 330 may be configured to retrieve the protective film 331 from the outer surface of the battery assembly 100. The protective film supply unit 330 may be configured to retrieve the protective film 331 interposed between the battery assembly 100 and the module housing 210 after the insertion of the battery assembly 100 into the internal space of the housing 210 is completed.

Therefore, according to such a configuration of the present disclosure, since the protective film supply unit 330 retrieves the protective film 331 when the process of inserting the battery assembly 100 is completed, the outer surface of the battery assembly 100 and the inner surface of the internal space of the module housing 210 can be allowed to come into contact with each other, thereby greatly increasing the completeness of the battery module 200 without damaging the battery assembly 100.

In addition, the protective film transfer unit 320 may be configured to hold a part of the supplied protective film 331. At this time, the protective film transfer unit 320 may hold an intermediate portion of the protective film 331 except for one end portion and the other end portion thereof in a longitudinal direction. Furthermore, the protective film transfer unit 320 may hold one portion and the other portion of the protective film 331 in a state of being overlapped with each other.

Figure 5:
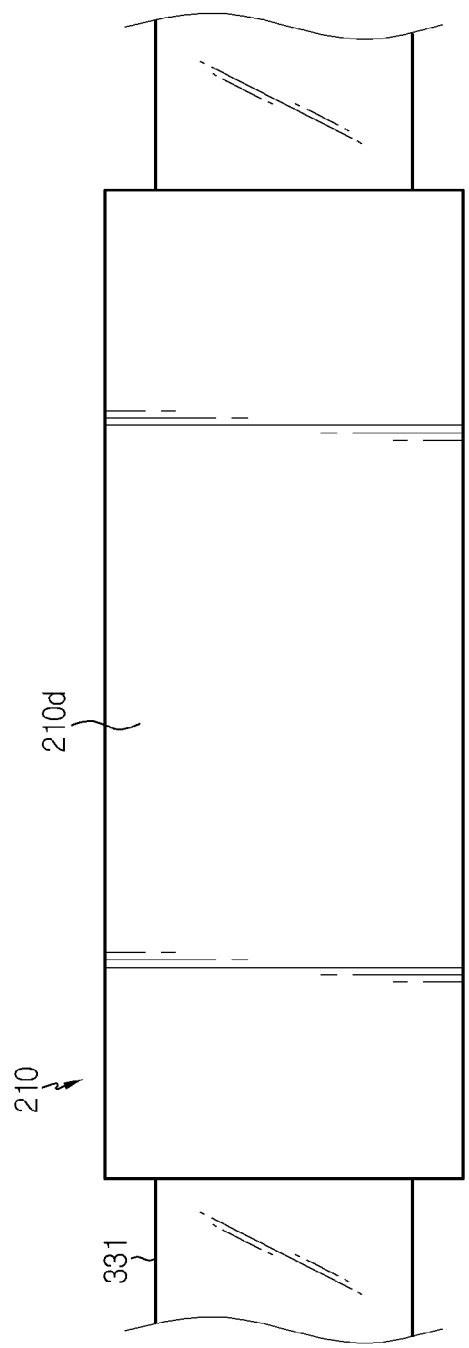
FIG. 5 is a partial side view schematically illustrating a shape of the battery module manufacturing apparatus of FIG. 4, when viewed in a C' direction.

FIG. 5 is a partial side view schematically illustrating a shape of the battery module manufacturing apparatus of FIG. 4, when viewed in a C' direction.

Referring to FIGS. 4 and 5, the protective film transfer unit 320 may move the battery assembly 100 in an insertion direction in which the battery assembly 100 is inserted into the module housing 210 and in a direction opposite to the insertion direction in a state of holding a part of the supplied protective film 331.

Furthermore, the protective film transfer unit 320 may move the protective film 331 in an insertion direction in which the battery assembly 100 is inserted into the module housing 210 so as to allow the protective film 331 to pass through the internal space of the module housing 210. That is, the protective film transfer unit 320 may move the protective film 331 so that the protective film 331 covers the side surface of the battery assembly 100 while the battery assembly 100 is inserted into the internal space of the module housing 210.

For example, as illustrated in FIG. 5, since the protective film transfer unit 320 moves the protective film 331 in an insertion direction in which the battery assembly 100 is inserted into the module housing 210 so that the protective film 331 passes through the internal space of the module housing 210, a part of the protective film 331 may be disposed in the internal space of the module housing 210, and the protective film 331 may cover the side surface of the battery assembly 100 while the battery assembly 100 is inserted into the internal space of the module housing 210.

In contrast, the protective film transfer unit 320 may move in a direction opposite to the insertion direction so as to hold the protective film 331 supplied from the protective film supply unit 330. At this time, the protective film supply unit 330 may move in a direction opposite to the insertion direction so as to pass through the internal space of the module housing 210, and may hold the protective film 331 in a state of passing through the module housing 210.

This will be described in more detail with reference to FIG. 9.

Therefore, according to such a configuration of the present disclosure, since the protective film transfer unit 320 moves in an insertion direction in which the battery assembly 100 is inserted into the module housing 210 and in a direction opposite to the insertion direction, the protective film transfer unit 320 may move the protective film 331 to the side surface of the battery assembly 100 so as to cover the side surface of the battery assembly 100 by the protective film 331 while the battery assembly 100 is inserted into the internal space of the module housing 210. Therefore, it is possible to completely protect the outer appearance of the battery assembly 100 while the battery assembly 100 is inserted into the internal space of the module housing 210.

The protective film supply unit 330 may include two protective film supply rolls 330A and 330B. Specifically, the two protective film supply rolls 330A and 330B may share the protective film 331 that is formed as a single film. That is, one end portion of the protective film 331 in the longitudinal direction may be wound around one protective film supply roll 330A of the two protective film supply rolls 330A and 330B, and the other end portion of the protective film 331 in the longitudinal direction may be wound around the other protective film supply roll 330B.

Furthermore, the protective film supply unit 330 may include an electric motor that rotates in a direction in which the protective film supply rolls 330A and 330B supply the protective film 331 or in a direction in which the protective film 331 is retrieved.

For example, the two protective film supply rolls 330A and 330B may simultaneously supply the protective film 331 so as to cover one side surface of the battery assembly 100, or may simultaneously retrieve the protective film 331 so as to be detached from one side surface of the battery assembly 100.

Therefore, according to such a configuration of the present disclosure, the supply and retrieval of the protective film 331 can be performed more quickly by simultaneously using the two protective film supply rolls 330A and 330B, as compared with the use of one protective film supply roll 330A. Therefore, there is an advantage that the manufacturing time of the battery module 200 can be shortened.

In addition, in a protective film supply unit 330 according to another embodiment of the present disclosure, one protective film supply roll 330A of two protective film supply rolls 330A and 330B is configured to supply the protective film 331 so as to cover one side surface of the battery assembly 100, and the other protective film supply roll 330B is configured to retrieve the protective film 331 so as to be detached from one side surface of the battery assembly 100.

Furthermore, the one protective film supply roll 330A of the two protective film supply rolls 330A and 330B may move the protective film 331 according to a distance at which the protective film 331 is moved by the protective film transfer unit 320, while the protective film transfer unit 320 moves the protective film 331 in an insertion direction in which the battery assembly 100 is inserted into the module housing 210.

The other protective film supply roll 330B may retrieve the protective film 331 interposed between the battery assembly 100 and the module housing 210 at a time point when the mounting of the battery assembly 100 on the module housing 210 is completed.

Therefore, according to such a configuration of the present disclosure, when two protective film supply rolls 330A and 330B share the role of supplying or retrieving the protective film 331, one protective film supply roll 330A supplies a new protective film 331 so as to cover the outer surface of the battery assembly 100, and the other protective film supply roll 330B retrieves the protective film 331 already used in the inserting process. Since the protective film 331 already used is not reused, there is an advantage that can reduce the failure rate due to the reuse of the damaged protective film 331.

Figure 6:
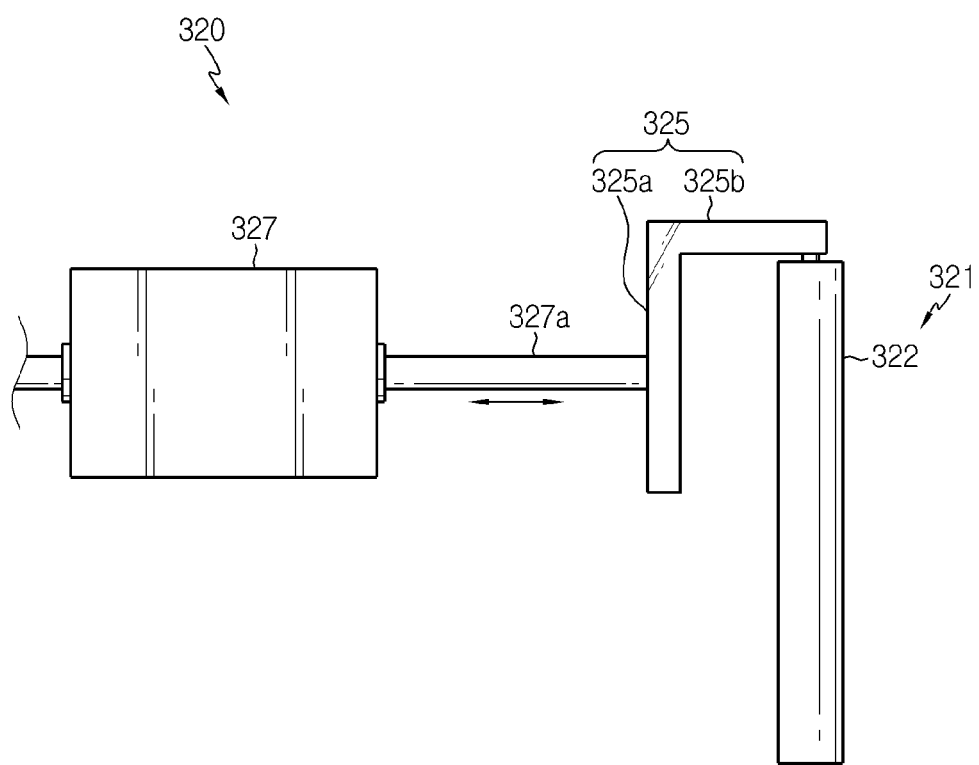
FIG. 6 is a side view schematically illustrating a protective film transfer unit as a part of the battery module manufacturing apparatus, according to an embodiment of the present disclosure.

FIG. 6 is a side view schematically illustrating the protective film transfer unit as a part of the battery module manufacturing apparatus, according to an embodiment of the present disclosure.

Referring to FIG. 6, the protective film transfer unit 320 may include a film holder 321, a transfer jig 325, and a transfer cylinder 327.

Specifically, the film holder 321 may be configured to hang and hold the protective film 331. In addition, the film holder 321 may include a holding roller 322 configured to be rotatable according to the movement of the protective film 331. More specifically, the holding roller 322 may include a vertical rotational shaft at the center of the holding roller 322 so that the holding roller 322 is rotatable around the rotational shaft. The holding roller 322 may have an outer surface extending in a vertical direction so that the protective film 331 is movable in contact with the outer surface.

Therefore, according to such a configuration of the present disclosure, when the holding roller 322 is provided as the film holder 321, since the holding roller 322 is rotatable according to the movement of the protective film 331, the protective film 331 can be smoothly and precisely moved without being stagnated. Therefore, the frictional force between the side surface of the battery assembly 100 and the protective film 331 can be minimized while the battery assembly 100 is inserted.

Furthermore, the transfer jig 325 may be configured to mount the film holder 321. Specifically, the transfer jig 325 may be configured to mount or separate the film holder 321. The transfer jig 325 may include a support portion 325a extending in the vertical direction and a fixing arm 325b extending from the upper end portion of the support portion 325a in the horizontal direction. At this time, the upper end portion of the film holder 321 may be fixed to the fixing arm 325b of the transfer jig 325 so as to be horizontally rotatable around the vertical axis of rotation.

Furthermore, the protective film transfer unit 320 may be configured to release the holding state to allow the protective film 331 to be detached from the film holder 321. Specifically, in the protective film transfer unit 320, the lower portion of the transfer jig 325 is opened so that the protective film 331 held on the film holder 321 is detached, or the new protective film 331 is held on the film holder 321.

For example, as illustrated in FIG. 6, the transfer jig 325 of the protective film transfer unit 320 may include a fixing arm 325b that fixes the upper end of the holding roller 322 as the film holder 321, and the lower portion of the support portion 325a may be opened so that the protective film 331 is inserted or detached.

Therefore, according to such a configuration of the present disclosure, since the protective film transfer unit 320 includes the fixing arm 325b of the transfer jig 325, the positioning of the protective film 331 from the film holder 321 is facilitated, and the upright state of the film holder 321 in the vertical direction is properly maintained. Therefore, after the protective film 331 is held on the film holder 321, the protective film 331 can be stably transferred in an upright state.

In addition, the protective film transfer unit 320 separates the film holder 321 from the transfer jig 325 to detach the protective film 331 held on the transfer jig 325, or may easily separate the film holder 321 from the transfer jig 325 so that the new protective film 331 can be held on the film holder 321.

The protective film transfer unit 320 may include a transfer cylinder 327 that generates a moving force in a horizontal direction. Specifically, the transfer cylinder 327 may be an electric cylinder that converts a rotational motion of the motor into a straight line motion through a screw, and the electric cylinder may perform mechanical work by moving the moving shaft 327a in a linearly reciprocating manner according to the rotating direction of the motor.

The transfer cylinder 327 may be configured to move the transfer jig 325 in the forward and backward directions. Furthermore, the moving shaft 327a of the transfer cylinder 327 may be connected to one side of the support portion 325a of the transfer jig 325. For example, one end portion of the moving shaft 327a of the transfer cylinder 327 may be connected to the transfer jig 325. Accordingly, the transfer jig 325 may be moved in the forward and backward directions by being moved in the forward and backward directions by the transfer cylinder 327.

Therefore, according to such a configuration of the present disclosure, the protective film transfer unit 320 has an advantage that the protective film 331 can be precisely transferred in the forward and backward directions by using the transfer cylinder 327.

Referring to FIGS. 4 and 5 again, the film holder 321 may be configured to be moved through the space of the module housing 210 formed so as to accommodate the battery assembly 100 in a state in which a part of the protective film 331 supplied from the two protective film supply roll 330A is held by the protective film transfer unit 320.

In other words, the protective film transfer unit 320 may move the film holder 321 in an insertion direction in which the battery assembly 100 is inserted into the module housing 210 so as to allow the protective film 331 to pass through the internal space of the module housing 210.

In contrast, the protective film transfer unit 320 may move the film holder 321 in a direction opposite to the insertion direction in which the battery assembly 100 is inserted into the module housing 210 so as to pass through the internal space of the module housing 210.

Figure 7:
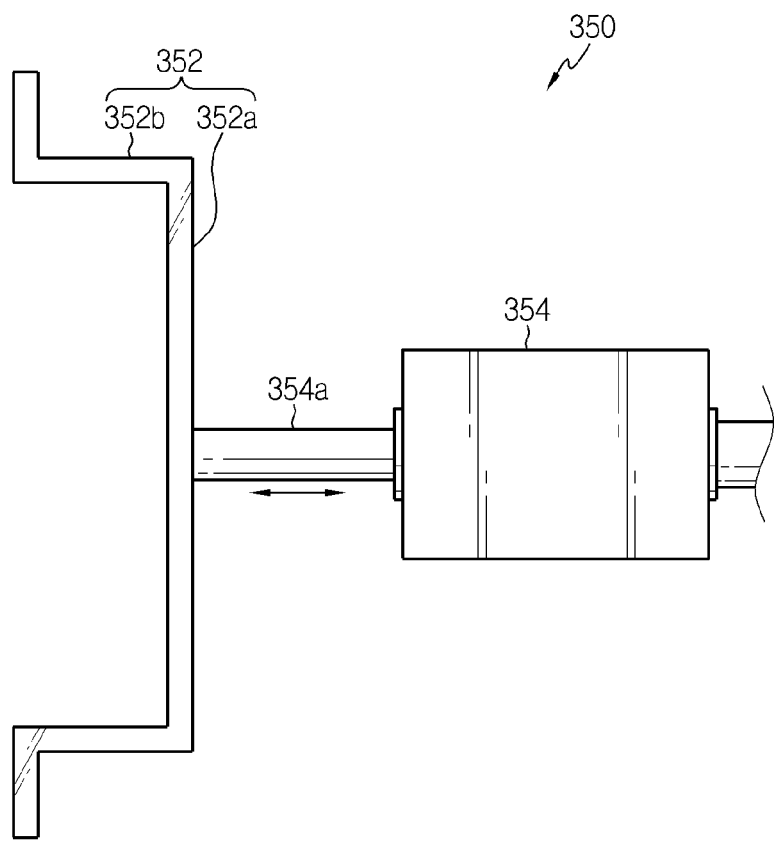
FIG. 7 is a side view schematically illustrating a battery assembly transfer unit as a part of the battery module manufacturing apparatus, according to an embodiment of the present disclosure.

FIG. 7 is a side view schematically illustrating the battery assembly transfer unit as a part of the battery module manufacturing apparatus, according to an embodiment of the present disclosure.

Referring to FIGS. 4 and 7 again, the battery module manufacturing apparatus 300 may further include a battery assembly transfer unit 350. Specifically, the battery assembly transfer unit 350 may be configured to move the battery assembly 100 to allow the battery assembly 100 to be inserted into the accommodation space of the module housing 210.

In addition, the battery assembly transfer unit 350 may include a pressing jig 352 configured to press one side of the battery assembly 100. More specifically, the pressing jig 352 may be configured to press the upper and lower ends of one side of the battery assembly 100.

For example, as illustrated in FIG. 7, the pressing jig 352 may include a main body portion 352a extending in the vertical direction and a pressing arm 352b extending in the horizontal direction from both ends of the main body portion 352a in the vertical direction. The end portion of the pressing arm 352b in the extending direction may be bent and extended in the vertical direction. Therefore, the pressing arm 352b may effectively press the upper and lower ends of one side of the battery assembly 100.

In addition, the battery assembly transfer unit 350 may further include a pressing cylinder 354 configured to move the pressing jig 352 in the forward and backward directions.

Here, the pressing cylinder 354 may be, for example, an electric cylinder. As described above, the electric cylinder may perform mechanical work by moving the moving shaft 354a in a linearly reciprocating manner by converting the rotational motion of the motor into the straight line motion through the screw.

The pressing cylinder 354 may be configured to move the pressing jig 352 in the forward and backward directions. Furthermore, the moving shaft 354a of the pressing cylinder 354 may be connected to one side of the main body portion 352a of the pressing jig 352. For example, one end portion of the moving shaft 354a of the pressing cylinder 354 may be connected to the pressing jig 352. Accordingly, as the moving shaft 354a is moved in the forward and backward direction according to the operation of the pressing cylinder 354, the pressing jig 352 may be moved in the forward and backward directions.

Referring to FIGS. 2 and 4 again, the protective film transfer unit 320 may transfer the protective film 331 so as to cover the outer surface of the heat dissipation pad 130.

The protective film transfer unit 320 may be configured to be movable in a direction N perpendicular to the insertion direction in which the battery assembly 100 is inserted into the module housing 210. Furthermore, the protective film transfer unit 320 may be positioned to allow the held protective film 331 to press at least a part of the heat dissipation pad 130.

That is, the protective film transfer unit 320 may be configured so that the protective film 331 presses the heat dissipation pads (130 in FIG. 2) formed on both sides of the battery assembly 100 by changing the position where the film holder 321 holds the protective film 331 to the direction N perpendicular to the insertion direction in which the battery assembly 100 is inserted into the module housing 210.

Therefore, according to such a configuration of the present disclosure, since the protective film transfer unit 320 moves in the perpendicular direction N in which the heat dissipation pad 130 is pressed by the protective film 331, the total volume of the battery assembly 100 to which the heat dissipation pad 130 is attached can be reduced. Therefore, the process of inserting the battery assembly 100 into the module housing 210 can be facilitated, and the risk of damaging the heat dissipation pad 130 can be greatly reduced.

Figure 8:
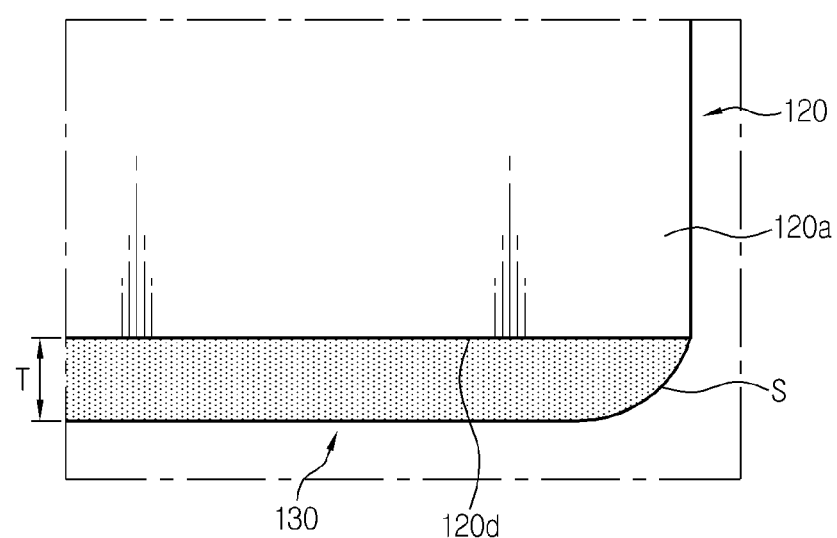
FIG. 8 is a partial enlarged plan view schematically illustrating a portion corresponding to a region D' of the battery assembly in FIG. 1, according to another embodiment of the present disclosure.

FIG. 8 is a partial enlarged plan view schematically illustrating a portion corresponding to a region D' of the battery assembly in FIG. 1, according to another embodiment of the present disclosure.

Referring to FIGS. 1, 4, and 8, a structure S in which the thickness of the battery assembly 100 in the outward direction continuously increases in the direction opposite to the insertion direction in which the battery assembly 100 is inserted into the module housing 210 may be formed at one end portion of the heat dissipation pad 130 in the direction in which the module housing 210 is disposed.

That is, one end portion of the heat dissipation pad 130 in the direction in which the module housing 210 is disposed is a portion in which collision or friction with the sidewall of the module housing 210 and the inner surface of the internal space easily occurs. A continuously thickening structure S may be formed so as to reduce the damage of one end portion of the heat dissipation pad 130 and facilitate the insertion of the battery assembly 100 into the internal space of the module housing 210.

Therefore, according to such a configuration of the present disclosure, since the heat dissipation pad 130 can effectively reduce friction or collision with the module housing 210, the heat dissipation pad 130 exhibits effects that can minimize the failure rate due to damage and can shorten the time of the inserting process with the module housing 210.

Referring to FIG. 4 again, the battery module manufacturing apparatus 300 may further include a plurality of guide rollers 360 configured to guide the moving direction of the protective film 331. Specifically, the guide roller 360 may be configured to guide the transfer direction or the transfer path of the protective film 331 supplied to the protective film supply unit 330.

For example, as illustrated in FIG. 4, the battery module manufacturing apparatus 300 may include four guide rollers 360. The four guide rollers 360 are disposed on both sides of the battery assembly 100 to guide the transfer direction or the transfer path of the protective film 331 supplied to the protective film supply unit 330, or to guide the transfer direction or the transfer path of the protective film 331 while the protective film 331 is being retrieved to the protective film supply unit 330.

FIGS. 9 to 13 are plan views schematically illustrating a manufacturing process of a battery module manufacturing apparatus, according to an embodiment of the present disclosure. Here, for convenience of description, the module housing 210 illustrated in the plan views is illustrated as cross-sectional views so that the internal space for accommodating the battery assembly 100 can be seen from the outside.

Figure 9:
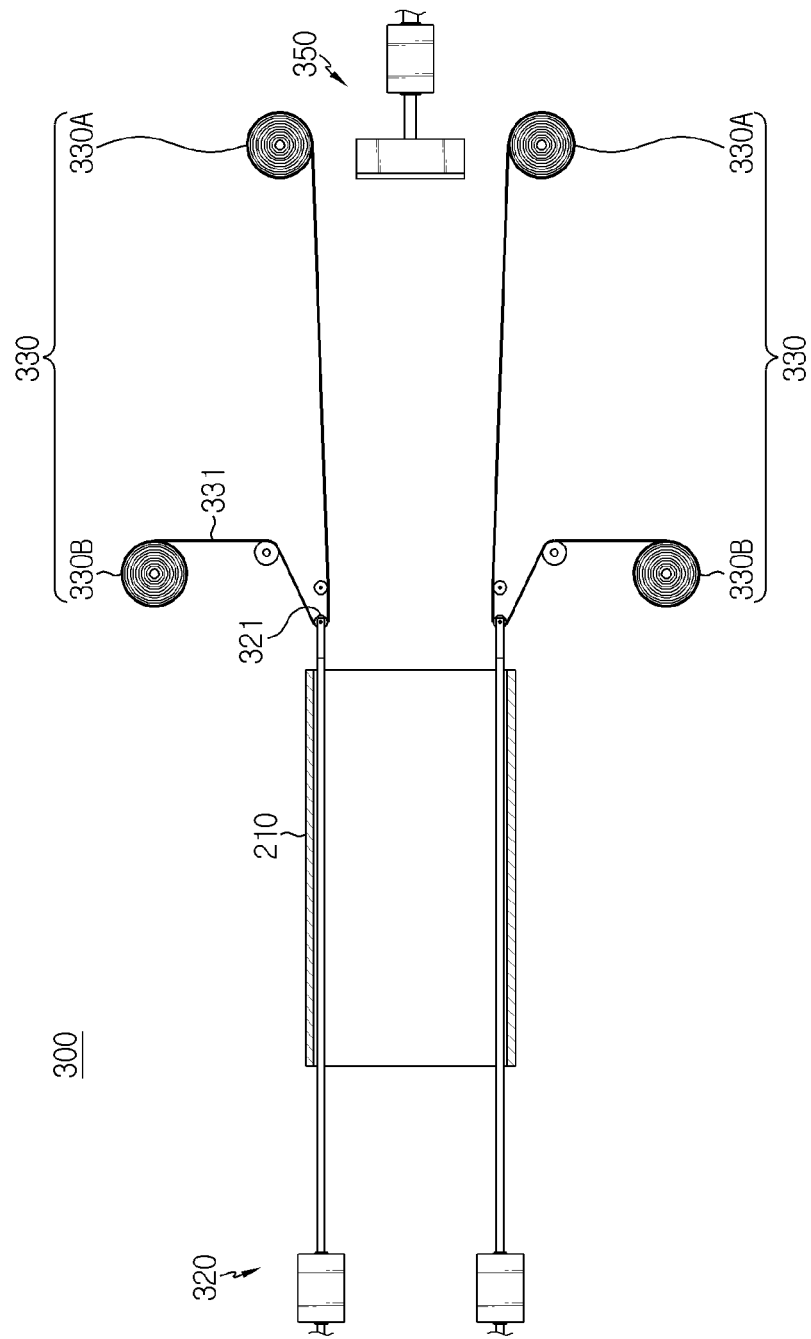

First, referring to FIGS. 6 and 9, the battery module manufacturing apparatus 300 may perform a process (a) of holding the protective film 331 unwound from the protective film supply unit 330 to the protective film transfer unit 320. Specifically, the protective film transfer unit 320 can hang and hold a part of the protective film 331 on the film holder 321 fixed to the transfer jig 325, so as to hold a part of the protective film 331 on the film holder 321.

At this time, the protective film transfer unit 320 can move the film holder 321 through the internal space of the module housing 210.

Figure 10:
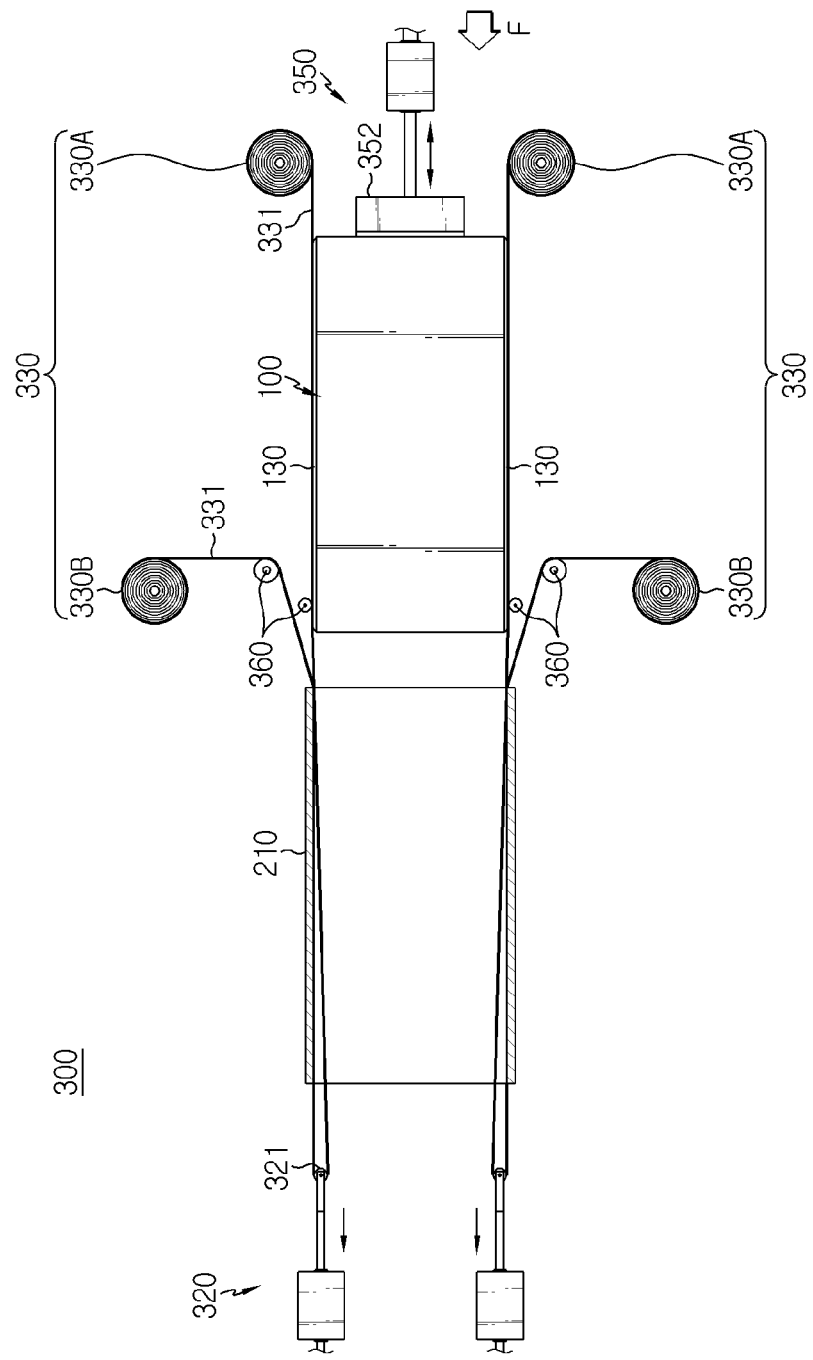

Referring to FIGS. 6 and 10, when viewed in the F direction, the battery module manufacturing apparatus 300 may perform a process (b) of moving the film holder 321 backward so that the protective film transfer unit 320 moves the protective film 331 through the internal space of the module housing 210 for accommodating the battery assembly 100. Therefore, the film holder 321 of the protective film transfer unit 320 is positioned behind the module housing 210.

Figure 11:
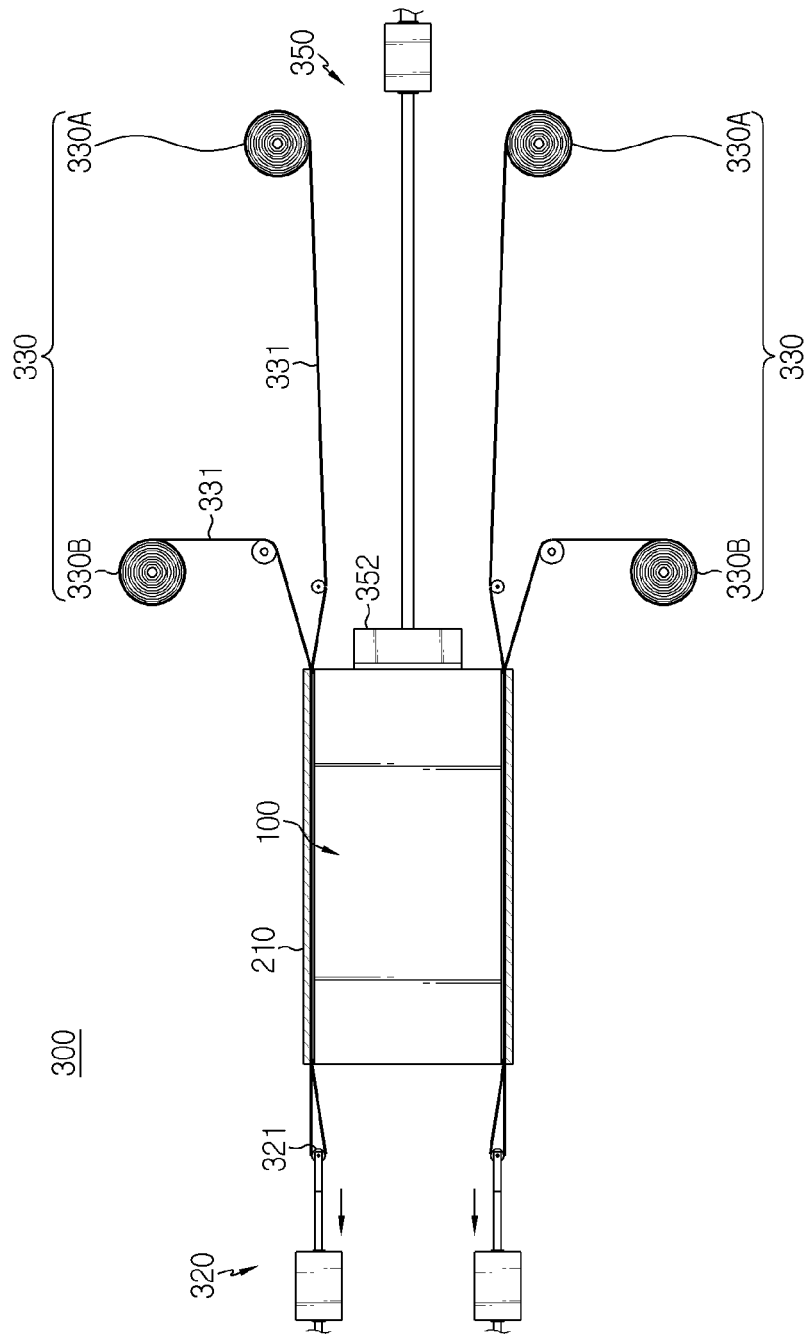

Referring to FIGS. 7 and 11, the battery module manufacturing apparatus 300 may perform a process (c) of moving the battery assembly 100 so that the battery assembly 100 is inserted into the accommodation space of the module housing 210 when the protective film 331 covers the outer surface of the battery assembly 100.

Specifically, since the battery assembly transfer unit 350 presses one side of the battery assembly 100 by using the pressing jig 352, the battery assembly 100 may be moved so that the battery assembly 100 is inserted into the accommodation space of the module housing 210.

Furthermore, the protective film transfer unit 320 may move the protective film 331 backward by a distance at which the battery assembly 100 is moved, so that the battery assembly 100 is inserted into the accommodation space of the module housing 210.

Furthermore, in the process (c), the protective film transfer unit 320 may transfer the protective film 331 in an insertion direction in which the battery assembly 100 is inserted into the module housing 210, and the protective film supply unit 330 may supply the protective film 331 to the protective film transfer unit 320. That is, the protective film supply unit 330 may additionally supply the protective film 331 to the film holder 321 by a distance at which the protective film 331 is moved backward by the protective film transfer unit 320.

For example, the two protective film supply rolls 330A and 330B provided in the protective film supply unit 330 may simultaneously supply the protective film 331 so as to cover one side surface of the battery assembly 100. Alternatively, only one of the two protective film supply rolls 330A and 330B may be configured to supply the protective film 331 so as to cover one side surface of the battery assembly 100.

Therefore, according to such a configuration of the present disclosure, since the battery assembly 100 is moved together with the protective film 331 in the same direction as the protective film 331 by the same distance as the protective film 331, it is possible to minimize friction and damage that may occur in the process of inserting the battery assembly 100 into the module housing 210, thereby reducing the failure rate. In addition, it is possible to guide the inserting process to be smoothly performed, thereby effectively reducing the manufacturing time.

Figure 12:
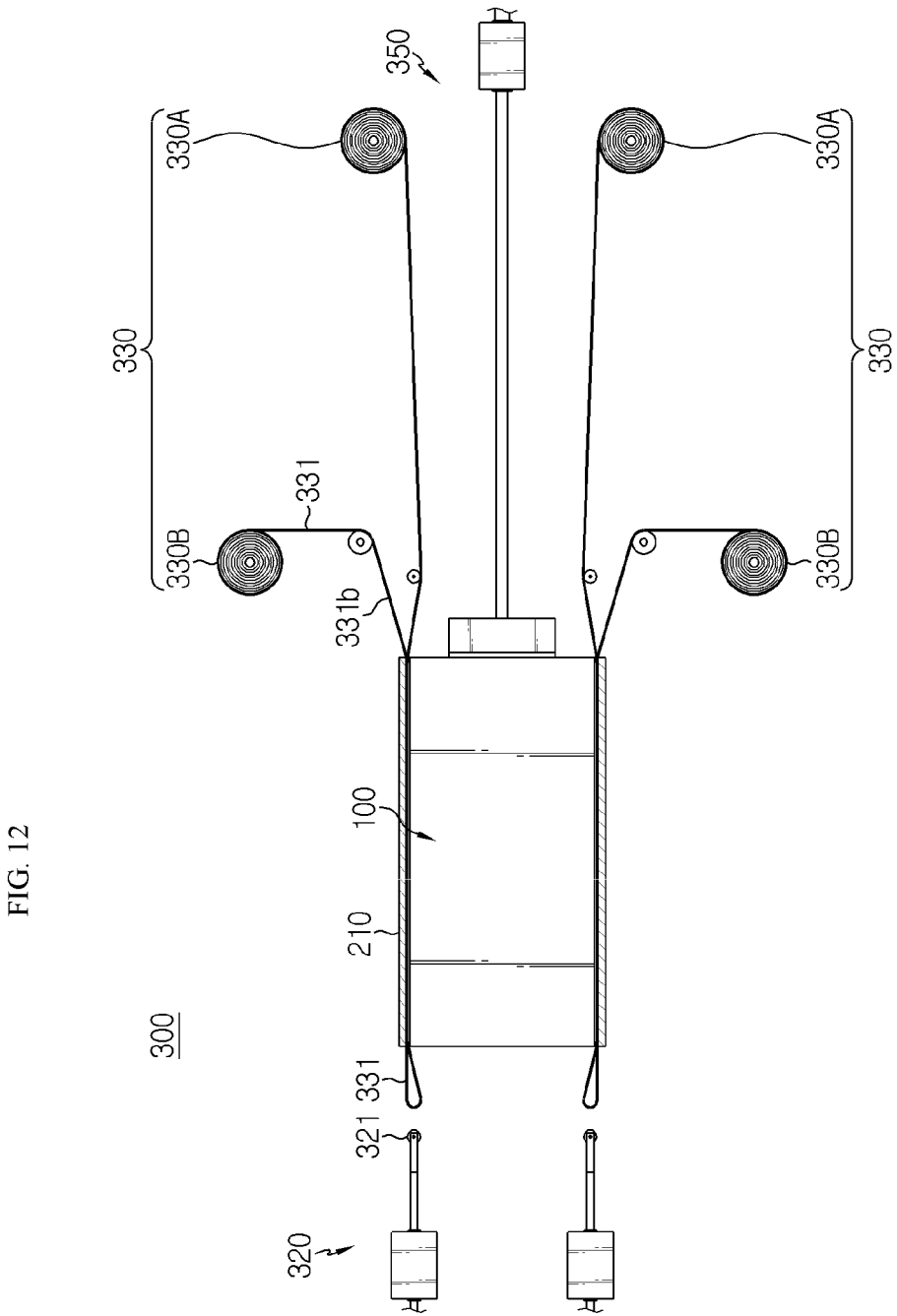

Referring to FIGS. 6 and 12, the battery module manufacturing apparatus 300 may perform a process (d) of detaching the protective film 331 from the protective film transfer unit 320. Specifically, the protective film transfer unit 320 may detach the protective film 331 through the opened structure below the transfer jig 325. In this manner, the protective film 331 may be detached from the protective film transfer unit 320.

Referring to FIG. 13, the battery module manufacturing apparatus 300 may perform a process (e) in which the protective film supply unit 330 winds and retrieves the protective film 331 detached from the protective film transfer unit 320. Specifically, the protective film supply unit 330 may retrieve the protective film 331 interposed between the battery assembly 100 and the sidewall of the module housing 210.

For example, the two protective film supply rolls 330A and 330B provided in the protective film supply unit 330 may retrieve the protective film 331 so as to be detached from one side surface of the battery assembly 100 at the same time.

Alternatively, one protective film supply roll 330A of the two protective film supply rolls 330A and 330B provided in the protective film supply unit 330 is configured to supply the protective film 331 so as to cover one side surface of the battery assembly 100, and the other protective film supply roll 330B is configured to retrieve the protective film 331 so as to be detached from one side surface of the battery assembly 100.

In this case, of the overlapped two layers of the protective film 331 interposed between the battery assembly 100 and the inner surface of the module housing 210, the protective film 331b that is not in contact with the battery assembly 100 and is in contact with the inner surface of the module housing 210 may be first retrieved.

Therefore, according to such a configuration of the present disclosure, when the other protective film supply roll 330B is configured to retrieve the protective film 331 so as to be detached from one side surface of the battery assembly 100, it is possible to minimize the damage of the battery assembly 100 due to the friction that may occur in the process of retrieving the protective film 331.

In the present specification, although the terms indicating directions such as up, down, left, right, front, and rear are used, it will be apparent to those skilled in the art that these terms are only for convenience of description and may vary depending on the location of the object or the location of the observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

LIST OF REFERENCE NUMERALS

- 100: Battery assembly
- 110: Secondary battery
- 111: Electrode lead
- 200: Battery module
- 120: Battery case
- 210: Module housing
- 130: Heat dissipation pad
- 300: Battery module manufacturing apparatus
- 320: Protective film transfer unit
- 321: Film holder
- 322: Holding roller
- 325: Transfer jig
- 327: Transfer cylinder
- 330: Protective film supply unit
- 331: Protective film
- 330A, 330B: Protective film supply roll
- 350: Battery assembly transfer unit
- 360: Guide roller

What is claimed is:

1. A battery module manufacturing apparatus, which inserts a battery assembly including a plurality of secondary batteries into a module housing, the battery module manufacturing apparatus comprising:
   a protective film supply unit configured to supply a protective film so as to cover an outer surface of the battery assembly or to retrieve the protective film from the outer surface of the battery assembly; and
   a protective film transfer unit configured to move in an insertion direction in which the battery assembly is inserted into the module housing and a direction opposite to the insertion direction in a state of holding a part of the supplied protective film.

2. The battery module manufacturing apparatus of claim 1, wherein the protective film supply unit comprises two protective film supply rolls configured to supply the protective film so as to share the protective film and cover one side surface of the battery assembly, or to retrieve the protective film so as to be detached from one side surface of the battery assembly.

3. The battery module manufacturing apparatus of claim 2, wherein one of the two protective film supply rolls is configured to supply the protective film so as to cover one side surface of the battery assembly, and the other thereof is configured to retrieve the protective film so as to be detached from one side surface of the battery assembly.

4. The battery module manufacturing apparatus of claim 2, wherein the protective film transfer unit comprises:
   a film holder configured to hang and hold the protective film;
   a transfer jig configured to mount the film holder; and
   a transfer cylinder configured to move the transfer jig in forward and backward directions.

5. The battery module manufacturing apparatus of claim 4, wherein the film holder comprises a holding roller configured to be rotatable according to movement of the protective film, and
   the holding roller is configured to be detachably attached to the transfer jig.

6. The battery module manufacturing apparatus of claim 4, wherein the protective film transfer unit is configured to release a holding state to allow the protective film to be detached from the film holder.

7. The battery module manufacturing apparatus of claim 4, wherein the film holder is configured to be moved through a space of the module housing formed so as to accommodate the battery assembly therein in a state of holding a part of the protective film supplied from the two protective film supply rolls.

8. The battery module manufacturing apparatus of claim 1, further comprising a battery assembly transfer unit configured to move the battery assembly to allow the battery assembly to be inserted into the accommodation space of the module housing.

9. The battery module manufacturing apparatus of claim 1, wherein a heat dissipation pad is provided on at least one of an upper surface, a lower surface, a left surface, and a right surface of the battery assembly, and
   the protective film transfer unit is configured to transfer the protective film so as to cover an outer surface of the heat dissipation pad.

10. The battery module manufacturing apparatus of claim 9, wherein the protective film transfer unit is configured to be movable in a direction perpendicular to an insertion direction in which the battery assembly is inserted into the module housing, and
   the protective film transfer unit is positioned to allow the held protective film to press at least a part of the heat dissipation pad.

11. The battery module manufacturing apparatus of claim 9, wherein a structure in which a thickness of the battery assembly in an outward direction continuously increases in a direction opposite to the insertion direction in which the battery assembly is inserted into the module housing is formed at one end portion of the heat dissipation pad.

12. The battery module manufacturing apparatus of claim 1, further comprising a plurality of guide rollers configured to guide a moving direction of the protective film.

* * * * *